United States Patent [19]
Ehrlund

[11] Patent Number: 4,650,217
[45] Date of Patent: Mar. 17, 1987

[54] CONTINUOUS STRIP OF MUTUALLY HINGED PANELS

[75] Inventor: Åke Ehrlund, Spånga, Sweden

[73] Assignee: Konstruktionsatelje Ake Åhrlund AB, Spånga, Sweden

[21] Appl. No.: 676,633

[22] Filed: Nov. 30, 1984

[30] Foreign Application Priority Data

Jan. 9, 1984 [SE] Sweden .............................. 8400071

[51] Int. Cl.⁴ ............................................ B32B 3/10
[52] U.S. Cl. .................................. 282/12 A; 283/62; 428/124; 428/131; 428/136
[58] Field of Search ................ 428/124, 43, 131, 136; 206/390, 820; 40/2 R; 282/12 A, 12 R; 283/62

[56] References Cited

U.S. PATENT DOCUMENTS 1,527,382 2/1925 Snyder .

FOREIGN PATENT DOCUMENTS 16868 of 1891 United Kingdom ............... 206/390

*Primary Examiner*—Alexander S. Thomas
*Attorney, Agent, or Firm*—Hammond & Littell, Weissenberger & Dippert

[57] ABSTRACT

A continuous strip of mutually adjacent information-bearing panels are joined together by hinge means, each of which comprises a series of hinge openings and hinge sections. The relative positions of the hinge sections and openings of one higne means are so positioned in relation to the hinge sections and openings of a further hinge means as to enable the strip to be folded in a bundle or part bundle form, so that a selected panel can be brought to the top of the bundle or part bundle, with the hinge sections of a respective hinge means lying within the confines of the openings of the remaining hinge means.

14 Claims, 5 Drawing Figures

CONTINUOUS STRIP OF MUTUALLY HINGED PANELS

TECHNICAL FIELD

The present invention relates to a continuous strip of a preferably flexible material comprising a plurality of mutually sequential panels having located between mutually adjacent panels a weakened portion or hinge means, which enables the strip to be folded in a particular fashion, so as to form a folded bundle of superimposed panels with a selected panel facing the viewer.

BACKGROUND ART

A continuous strip of hinged panels of the aforementioned kind is used to form a long, continuous chain of, for example, data-strips. The general concept thereof, however, can also be used to provide a foldable data-bearing strip which can be folded to show, for example, the price of an article offered for sale.

There are found on the market punched or moulded numbers, letters and other symbols which, with the aid of an adhesive, are attached to a backing support and then placed on the goods for sale, or adjacent such goods, to indicate the selling price thereof. The price of goods stored on shelves is often shown by way of loose letters/numbers placed in the required order in a plastics envelope or the like placed on the edge of the shelf.

A third, although more seldom used method of showing the price of an article is one in which a number of panels printed with numbers/letters are separately attached to an elongated coil, in the form of a spiral-bound note book.

The method in which loose numbers/letters are used is troublesome. Each number/letter has to be placed in separate boxes. The marking procedure is time-consuming, and at times it may be found that the number of panels available is not sufficient to mark all the goods which need to be marked.

The object of the present invention is to provide a continuous strip of the kind defined in the introduction which enables names or prices to be indicated more rapidly and more effectively than has hitherto been possible; which is relatively inexpensive to produce; and which has a relatively long useful life.

DISCLOSURE OF THE INVENTION

To this end, the invention is characterized in that each weakened portion or hinge means comprises a plurality of bridges or hinge-sections and a plurality of openings which are so positioned in relation to one another that when the strip is folded along one of said hinge means, or along all of said hinge means, one bridge, or all bridges, of a hinge means will always co-act with an opening, or all openings, of a further selected hinge means, to effect the desired folding sequence of the strip.

So as to prevent the individual panels of a folded bundle of panels from being displaced relative to one another, each hinge means comprises at least two bridges and at least two openings.

In order to simplify the manufacture of such a continuous strip, and to keep the cost of manufacture low, it is proposed in accordance with the invention that within a group of hinge means of a continuous strip, the hinge-sections or bridges and openings of the odd-number hinge means, counting from one and/or the other of the outermost panels of the strip, are positioned differently to one another, while the bridges and openings of the even-number hinge means, counting from said one and/or said other of the outermost panels, are also positioned differently to one another, and that the positions of the bridges and openings in an odd-number and an even-number hinge means may be identical. In this respect, the maximum length of a particular opening in a hinge means is dependent upon the total number of hinge means included in the continuous strip.

Three advantageous embodiments of the invention will now be described in detail with reference to the accompanying drawings.

PREFERRED EMBODIMENT

Figure 1:
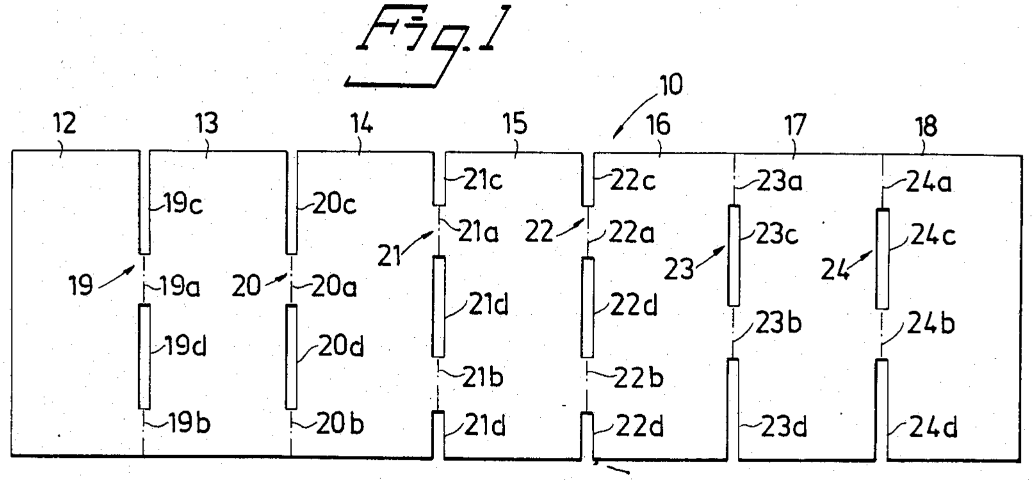
FIG. 1 illustrates a first embodiment of the continuous strip according to the invention, comprising seven panels hinged together by six hinge means.

The continuous strip 10 illustrated in FIG. 1 comprises a flexible material, for example paper. It will be understood, however, that the material from which the strip is made need not necessarily be flexible. Thus, the material may be an unbendable material, or may be bendable to varying degrees.

The illustrated strip 10 includes seven panels 12-18, which in the illustrated embodiment are shown to be of mutually the same size. The panels 12-18 are hinged together by respective vertically extending weakened portions or hinges 19-24. When counting, for example, from the left of the strip illustrated in FIG. 1, the references 19, 21 and 23 identify the odd-numbered hinge portions, i.e. said references represent the first, third and fifth hinge portion of the strip, while the references 20, 22 and 24 identify the second, fourth and sixth hinge portions, or the even-numbered hinge portions.

When the strip in FIG. 1 is viewed from its right-hand end, or is turned through 180°, the hinge portions referenced 24, 22 and 20 will be located in the odd-numbered positions, while the hinge portions referenced 23, 21 and 19 will occupy the even-numbered locations.

In accordance with the illustrated embodiment, each weakened or hinge portion 19-24 comprises two hinge sections or bridges **19*a*-24*a* and 19*b*-24*b* respectively, and at least two slot-like openings 19*c*-24*c* and 19*d*-24*d* respectively. Seen from one end of the strip, for example, the left-hand end, of the hinge portions 19-24 within the group, those which occupy the odd-number locations, thus portions 19, 21, 23 and of mutually different design, so that the mutual positioning of the hinge sections and openings differs. Correspondingly, the relative positions of the hinge-sections and openings of the even-numbered hinge portions are also mutually different. On the other hand, however, an odd-numbered hinge portion, for example portion 19, may be identical with an even-numbered portion, for example the hinge portion 20**.

In all embodiments, the slot-like openings 19c–24c and 19d–24d are formed by punching the strip 10, while the hinge-sections 19a–24a and 19b–24b are formed by the strip material located between the openings.

In order to facilitate manufacture of a continuous strip in accordance with the invention, with reference to what has been said in the aforegoing, the outermost weakened or hinge portion exhibits hinge-sections and openings which with respect to form and position are identical with the hinge-sections and openings of the hinge portion immediately adjacent thereto, although respective hinge sections and openings of one pair of hinges 19,20 and 23,24 respectively are positioned differently to the hinge sections and openings of the other pair.

Thus, in the embodiment illustrated in FIG. 1, the hinge-sections 21,21b and 22a,22b and the openings 21c,21d and 22c,22d of the two centrally arranged hinge portions 21,22 are mutually identical with respect to form and positioning, while deviating from the form and positioning of the hinge-like sections and openings of remaining hinge portions.

The invention is based on the general principle that when randomly folding the strip, or folding the strip in accordance with a desired pattern to form a bundle, or part bundle, each hinge-section shall co-act with an opening located in another weakened portion. In accordance herewith, the maximum length of an individual opening of a weakened portion is contingent upon the total number of hinge portions of a continuous strip.

In the example illustrated in FIG. 1, comprising seven mutually hinged panels, the hinge-sections of each hinge are of mutually equal length while the vertical extension of the openings of the hinge portions is at least equal to the length of a hinge-section and at most twice the length thereof.

Figure 4:
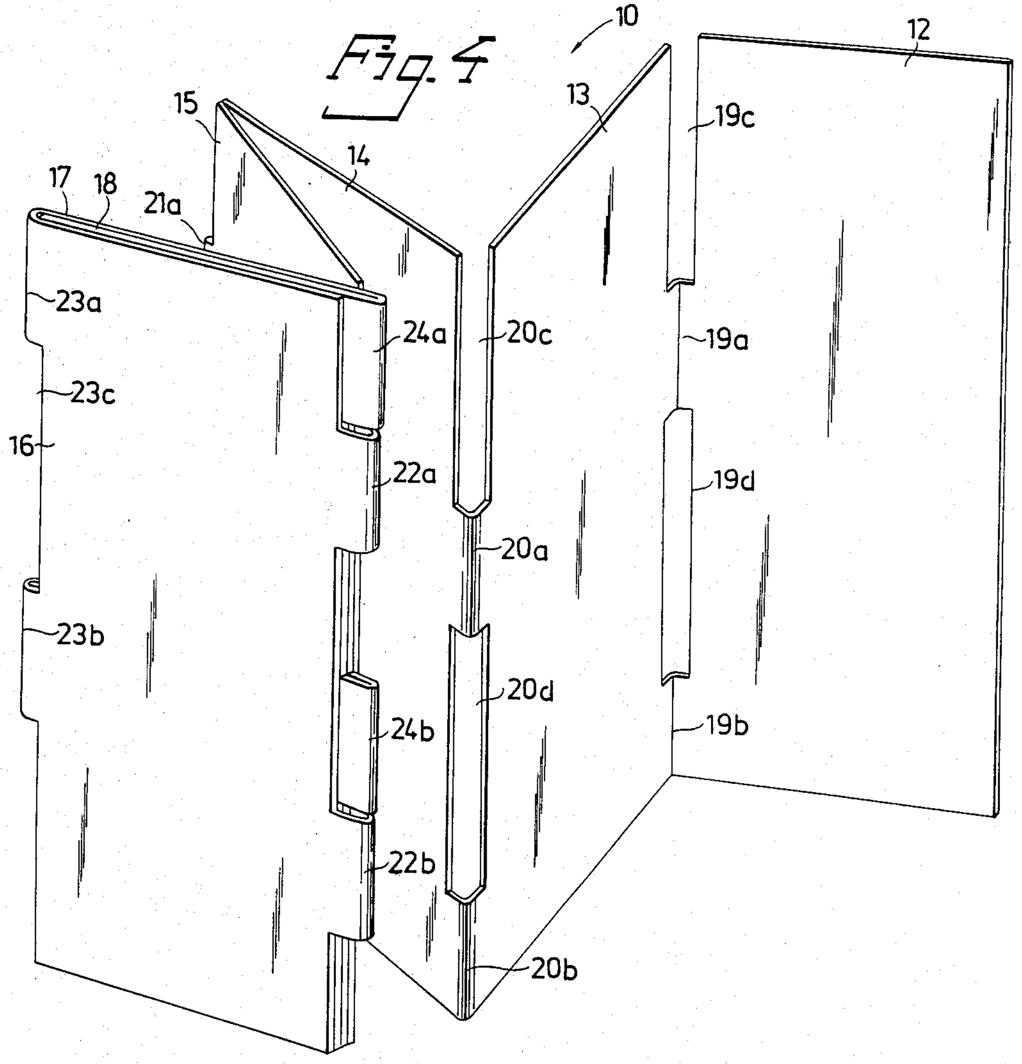
FIG. 4 shows the continuous strip of FIG. 1 during folding of the strip.

FIG. 4 illustrates one way in which the strip shown in FIG. 1 can be folded. It should be noted, however, that the strip illustrated in FIG. 4 has been drawn, for the sake of clarity, so that the viewer sees the rear side of the strip shown in FIG. 1.

The Figure illustrates in an explanatory fashion how the panel 18 is first folded via the weakened or hinge portion 24 so that the rear sides of the panels 18, 17 abut one another, whereafter the strip is again folded along the hinge portion 23, so as to bring the frontal side of the panel 18 into abutment with the rear side of the panel 16, the figure illustrating how the hinge-sections of each weakened portion co-act with the slot-like openings of another weakened portion. It is assumed that remaining panels of the strip 10 are then folded together in a concertina fashion, wherewith the bridges or hinge-sections 24a,24b of the hinge portion 24 together with the hinge-sections 22a,22b of the hinge portion 22 co-act with the openings 20c,20d of the hinge portion 22, the hinge-sections 20a,20b of which co-act with the openings 22c,22d of the hinge portion 20.

It will thus be seen that the strip 10 can be folded in an arbitrary manner to form a bundle, or part bundle, in which one or a number of panels are turned to face the viewer. Consequently, when seen in axial cross-section, a bundle of folded panels has a thickness corresponding to the thickness of the number of panels included in the strip. Because the hinge-sections of the hinge portions of the strip co-act in the aforedescribed manner with the openings of other hinge portions, the strip material will not be subjected to stresses or strains when folded to form a bundle or part bundle, or when unfolded from its bundled form.

Figure 2:
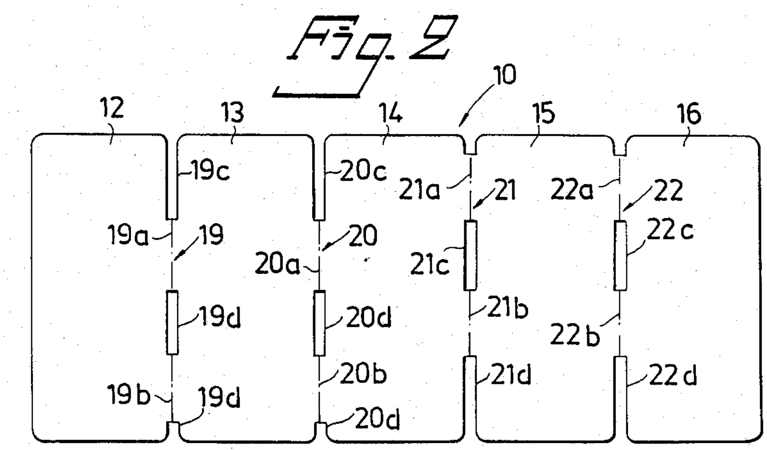
FIG. 2 illustrates a second embodiment of a continuous strip according to the invention, comprising four panels hinged together by five hinge means.

The strip illustrated in FIG. 2, comprises five mutually adjacent panels 12–16 hinged together by four hinge portions 19–22. Similarly to the embodiment described with reference to FIG. 1, each weakened or hinge portion comprises at least two bridges or hinge-sections 19a,19b and 22a,22b, and at least two openings 19c,19d and 22c,22d. This strip can also be folded in concertina fashion, or some other fashion, to form a bundle or part bundle, with one or more panels facing the viewer. In this embodiment, the hinge portions 19,20 and 21,22 are formed identically in pairs, i.e. the hinge-sections and openings of the hinge portions are identically shaped and positioned in pairs, although in addition hereto each such weakened or hinge portion of identical form with respect to the hinge-sections and openings is rotated groupwise through 180° in relation to one another, as illustrated in the Figure.

Figure 3:
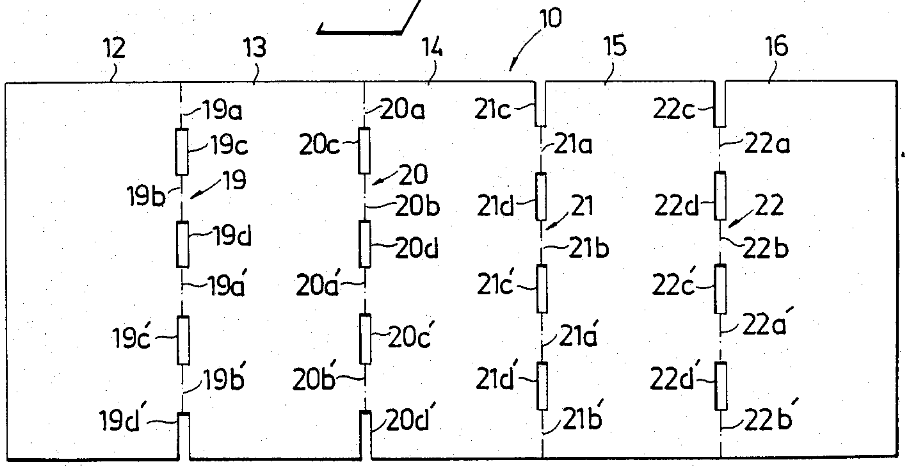
FIG. 3 illustrates a third embodiment of a continuous strip according to the invention.

In FIG. 3 there is illustrated a third embodiment of the invention which in principle coincides with the embodiment illustrated in FIG. 2, although with the difference that each weakened or hinge portion comprises four hinge-sections and slot-like openings, and that the openings 19c,19d, 19c', 19d' of a hinge portion are of the same length as the hinge-sections 19a,19b, 19a', 19b' of the same weakened portion. Groupwise, the hinge portions 19,20 and 21,22 respectively are both identically shaped and identically located, and the hinge-sections and openings of each hinge portion are identically shaped groupwise, although rotated through 180° relative to one another.

The panels 12–18 and 12–16 of the continuous strips illustrated in FIGS. 1, 2 and 3 can be provided on both sides thereof with one or more Arabic numerals and/or with letters and/or other characters or symbols. These numerals etc. are advantageously printed on each panel. By way of example, each panel of one side of a continuous strip according to FIG. 1 can be provided with an Arabic numeral, for example 1–7. The panels can be provided on the other side thereof with numerals 8,9,0,½,⅓,¼, kg.

Figure 5:
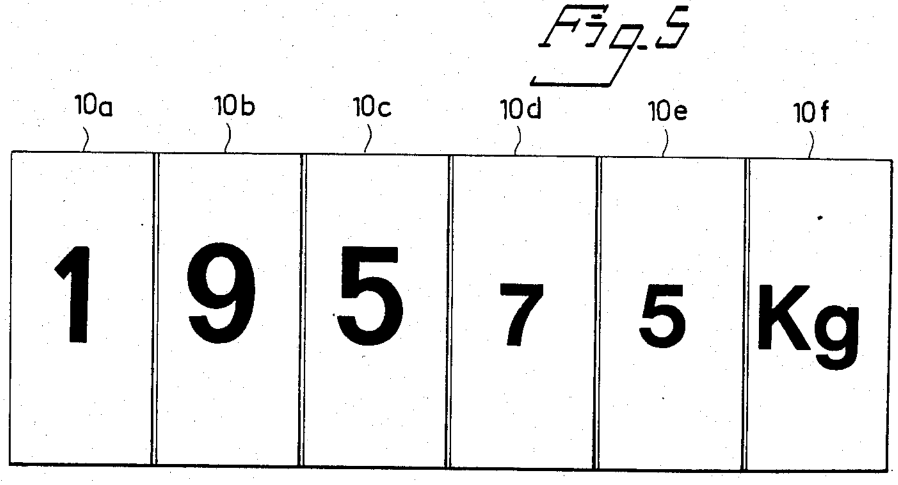
FIG. 5 illustrates six continuous strips according to any one of the FIGS. 1-3, each of which has been folded and placed adjacent another, to indicate the price of a particular article.

By marking strips according to the invention in this way the strips can be incorporated in a price-labelling system and folded to display the price of selected goods, for example in the manner illustrated in FIG. 5. In this Figure, the references 10a–10f illustrated six continuous strips, each corresponding to a strip according to the invention and each panel of a continuous strip being provided with numerals or characters on both sides thereof. As illustrated by way of example in FIG. 5, by folding a given number of strips in the required manner, the continuous strip 10f can be folded so that the panel exhibiting the numeral 1 faces the viewer, so that the strip 10b exhibits the numeral 9, and so on. By placing the last folded six bundles comprising strips 10a–10f next to one another, the price labelling of 195:75/kg is obtained. Each strip can be placed in a suitable holder of any shape or form and can be placed on a display board or directly on the goods or articles being priced.

As will be understood by one skilled in the art, the illustrative embodiments can be modified within the scope of the claims, and consequently the described and illustrated embodiments are not restrictive of the invention.

I claim:

1. A continuous strip of mutually adjacent information-bearing panels, wherein each panel is hinged to an adjacent panel by hinge means extending along the mutually opposing sides of said panels, each said hinge means comprising a series of hinge sections and openings so placed in relation to one another that when the strip is folded along said hinge means, a hinge section of one hinge means lies within the confines of a respective opening of all further hinge means.

2. A continuous strip of panels according to claim 1, wherein the hinge sections and openings of one hinge means are offset in relation to the hinge sections and openings of a subsequent hinge means.

3. A continuous strip of panels according to claim 1, wherein when viewed from one extremity of said strip the hinge sections and openings of an odd numbered hinge means and the hinge sections and openings of an even numbered hinge means are differently positioned to respective hinge sections and openings of the remaining odd numbered and even numbered hinge means, respectively.

4. A continuous strip according to claim 3, wherein the relative positions of the hinge sections and openings of an odd numbered hinge means are the same as those of an even numbered hinge means.

5. A continuous strip according to claim 1, comprising six hinge means, in which the relative positions of the hinge sections and openings of the outermost hinges at each end of the strip are identical to the relative positions of the hinge sections and openings of the next outermost hinge means.

6. A continuous strip according to claim 5, in which the relative positions of the hinge sections and openings of the two central hinqe means are mutually identical to but different from the relative positions of the hinge sections and openings of remaining hinge sections.

7. A continuous strip according to claim 1, in which each hinge means comprises at least two hinge sections and at least two openings.

8. A continuous strip according to claim 7, in which the distance between two adjacent hinge sections of one hinge means in relation to corresponding adjacent hinge sections of an adjacent hinge means is at least equal to the length of a hinge section of said hinge means.

9. A continuous strip according to claim 8, in which the hinge sections of each hinge means are of mutually equal length, and in which the openings of each said hinge means have a length which is at least equal to the length of an associated hinge section and at most equal to twice the length of said hinge section.

10. A continuous strip according to claim 1, comprising four hinge means, in which the relative positions of the hinge sections and openings of one pair of mutually adjacent hinge means are different from the relative positions of the hinge sections and openings of the other pair of hinge means.

11. A continuous strip according to claim 1, in which each panel bears on at least one side thereof a given character or numeral, or both.

12. A continuous strip according to claim 1, in which the hinge sections of respective hinge means comprise portions of original strip material remaining subsequent to forming the openings of said respective hinge means.

13. A continuous strip according to claim 1, in which the hinge sections and openings of respective hinge means are so positioned in relation to the hinge sections and openings of a further hinge means as to enable the strip to be folded into bundle form in a manner such that a selected panel is brought to the top of said bundle form.

14. A continuous strip according to claim 1, in which the panels are all the same size.

* * * * *